UNITED STATES PATENT OFFICE.

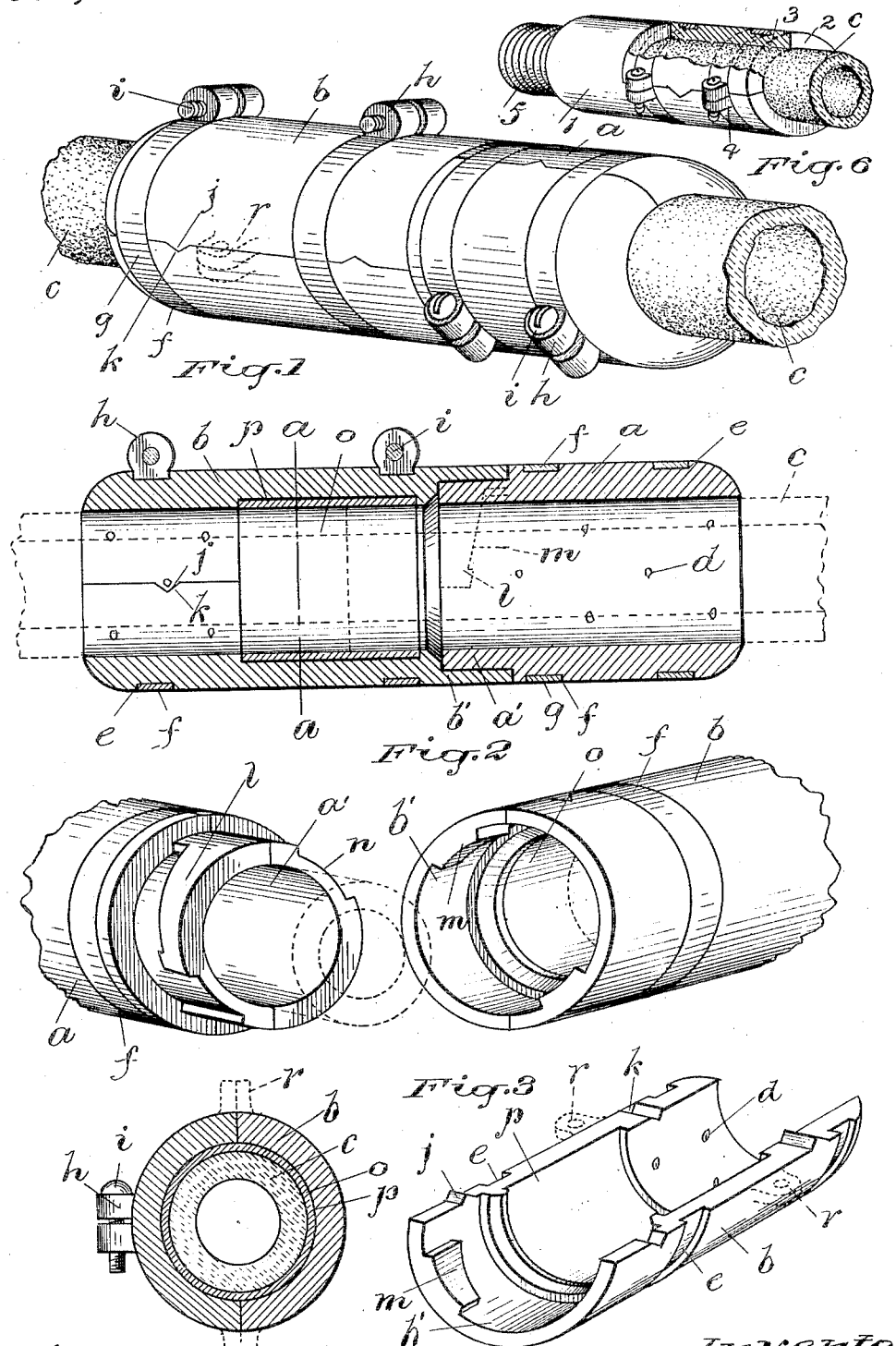

SAMUEL G. FORST, OF TORONTO, ONTARIO, CANADA.

TUBE-COUPLING.

1,081,226.     Specification of Letters Patent.     Patented Dec. 9, 1913.

Application filed June 17, 1912. Serial No. 704,227.

*To all whom it may concern:*

Be it known that I, SAMUEL G. FORST, a citizen of the United States, residing at Toronto, in the county of York and Province of Ontario, Dominion of Canada, have invented a new and useful Improvement in Tube-Couplers, of which the following is a specification.

My invention relates to means by which flexible tubes may be quickly coupled together, to provide a clear and unobstructed passage way for the conveyance of air, water and steam.

My coupling is specially adapted to be used in connection with pneumatic tools, whereby an absolutely air-tight connection is required at the connection of the tool with the end of the flexible tube, and also at any point in the tube where two ends are coupled together.

My coupler also involves means in its construction by which it is securely attached to the end of the tube.

I attain these objects by the device as illustrated in the accompanying drawings, in which—

Figure 1 is a perspective view of the coupler. Fig. 2 is a longitudinal sectional view through the coupler. Fig. 3 is a detailed perspective view of the coupler uncoupled. Fig. 4 is a cross sectional view through the coupler on lines $a$—$a$ Fig. 2. Fig. 5 is a perspective view of a part of coupler, and, Fig. 6 is a perspective view, partially in section of the means for connecting with the flexible tube.

Similar letters refer to similar parts throughout the several views.

$a$ and $b$ designate respectively the head and shank sections of the coupler, which consist essentially of semi-cylindrical members adapted to engage together over the free ends of the tube $c$. Formed on the internal walls of the sections $a$ and $b$ are pointed projections $d$, adapted to impress into the tube $c$ to prevent it turning or from being withdrawn from the coupling, either when handled or from the internal pressure fluid conveyed by the tube.

While I have shown pointed projections extending from the inner walls of the sections $a$ and $b$, any other form by which the inner walls may be roughened to bite into the flexible surface of the tube may be provided. Formed in the convex surface of the members $a$ and $b$ are channels $e$. The channels $e$ are so situated that when the semi-cylindrical sections are brought together, they become continous, so that a circumferential channel is formed.

$f$ designates clamping rings engaging in the circumferential channels by which the semi-cylindrical sections are held together in a cylindrical form to firmly attach around the tube $c$. The clamping rings may be of any suitable form preferable, as shown in the drawings in which they consist of a metal band $g$ formed with a head $h$ on each end. Through the heads are screw threaded bores, in which engage set screws $i$ by which the ends may be drawn together to firmly clamp the sections. Formed along the adjoining edges of the sections $a$ and $b$ are alternate projections $j$ and indentures $k$, adapted to correspondingly interlock to prevent the sections from longitudinal displacement.

While I have shown the projections and indentures along the adjoining edges of the sections, any other form of interlocking edges may be introduced, either along the sides or in from the ends for the same purpose without deviating from the nature of my invention.

$a'$ represents the head end of the coupler and $b'$ the socket end. Formed on the outer face of the head are helical flanges $l$, and formed on the inner face of the socket are locking lugs $m$. To couple the parts $a$ and $b$, the ends are brought together so that the locking lugs $m$ are brought opposite the grooves $n$ formed between the helical flanges on the head, when the head is then forced into the socket, and the parts partially rotated in opposite directions, so that the locking lugs $m$ lock behind the helical flanges $l$. The front end of each of the helical flanges on the head $a'$ are formed with a small shoulder against which the locking lugs abut, to prevent them from turning backward, except by a strong reverse rotatable action, which may be effected by taking a part in each hand, and pressing inwardly and turning in opposite directions, in which manner the ends may be uncoupled. $o$ designates a thimble engaging in a channel $p$ formed in the internal walls of the section $b$, the bore of the thimble being of the same diameter as the bore of the parts $a$ and $b$ when clamped together.

To couple together a flexible tube, the section $a$ is clamped around the tube leaving a part of the tube projecting slightly beyond the head end. The section *b* is then clamped around the end of the tube *c*, the end of the tube extending only as far as mid-way through the thimble *o*, so that when the two ends of the coupling are interlocked, the ends of the tube will be firmly engaging together. The object of bringing the ends of the tube together in the center part of the thimble, is to create an air-tight junction by the internal pressure of the fluid forcing the ends of the tubes tightly against the inner walls of the thimble. The greater the internal pressure, the tighter the ends of the tubes will be forced against the thimble thereby as far as possible eliminating all cause of leak.

While I have shown the means for coupling the shank and head together consisting of helical flanges formed on the head *a'* of the section *a*, and locking lugs *m* formed in the inner walls of the socket *b'* of the section *b*, formed in wedged shape, so that the greater the rotation of the parts in opposite directions in coupling, the tighter they are held together. I may slightly vary the design of the respective locking lugs and helical flanges without deviating from the nature of that part of my invention. One of the essential features of my invention lies in the means of quickly and tightly connecting the two ends together, and to eliminate washers, packing rings, and screw threads.

While I have shown my coupling adaptable to couple two ends of flexible tube together, the same principle of coupling may be introduced in connecting the end of the tube with the various forms of pneumatic tools. In Fig. 6 I have shown a slight modification in the form of a connection for the end of the tube with the tool, in which 1 designates the connection having a part 2 removable for the purpose of inserting the end of the tube into the section. The section 2 has formed on its inner walls pointed projections 3 adapted to impress into the tube, and it is held in position by clamping rings 4, similar to those for clamping the parts *a* and *b* together. On the end of the section 1, I have shown a screw-threaded head 5 adapted to screw into the tool, but for all practical purposes I will form at the end of the section, helical flanges similar to those shown in the section *a*, to engage with locking lugs formed with the connection from the tool, similar to those shown in the socket end of the section *b*, so that the end of the tube may be quickly connected with the tool.

While I have described my coupling especially adapted to a flexible tube to be used in connection with pneumatic tools, the same principle of coupling may be used for ordinary steam and water tubes.

While the parts are described and adapted for the purpose of a coupling, the section *b* may be readily utilized as a tube jacket for leak stopping, by slipping over the bursted part of the flexible tubes the thimble, and clamping the sections *b* together by the clamping rings *f*. As a further means for clamping the sections *a* and *b* together, I may form on the side edges of each section, fastening lugs *r*, as shown in dotted lines, in Figs. 1, 4, and 5, to hold together the members by bolts or set screws.

What I claim as new and desire to secure by Letters Patent is:—

A tube coupler, consisting of semi-cylindrical members, interlocking projections and indentures formed along the edges of said semi-cylindrical members, said semi-cylindrical members adapted to engage in cylindrical form, channels formed in the convex faces of said members, clamping rings adapted to engage in said channels, means for drawing the ends of said clamping rings together to maintain said members in cylindrical form, the inner walls of said members being roughened or having points projecting therefrom, socket and head ends formed on the said members, flanges formed in helical relation on the said head ends, and locking lugs formed in helical relation on the said socket end, said head end adapted to engage in the said socket end, and said locking lugs adapted to engage with said flanges, as and for the purpose specified.

Signed at Toronto the 13th day of June 1912.

S. G. FORST.

In the presence of—
JOE PODHORSER,
A. A. ADAMS.